(12) United States Patent
Li et al.

(10) Patent No.: US 11,816,440 B2
(45) Date of Patent: *Nov. 14, 2023

(54) METHOD AND APPARATUS FOR DETERMINING USER INTENT

(71) Applicant: Alibaba Group Holding Limited, Grand Cayman (KY)

(72) Inventors: Ling Li, Hangzhou (CN); Zhiwei Shi, Hangzhou (CN); Yanjie Liang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/971,047

(22) Filed: Oct. 21, 2022

(65) Prior Publication Data

US 2023/0044981 A1 Feb. 9, 2023

Related U.S. Application Data

(63) Continuation of application No. 16/352,159, filed on Mar. 13, 2019, now Pat. No. 11,514,245.

(30) Foreign Application Priority Data

Jun. 7, 2018 (CN) .......................... 201810580483.5

(51) Int. Cl.
   *G06F 40/30* (2020.01)
   *G06F 40/216* (2020.01)
   (Continued)

(52) U.S. Cl.
   CPC .............. *G06F 40/30* (2020.01); *G06F 18/24* (2023.01); *G06F 40/216* (2020.01); *G06V 10/40* (2022.01);
   (Continued)

(58) Field of Classification Search
   None
   See application file for complete search history.

(56) References Cited

U.S. PATENT DOCUMENTS 6,751,584 B2 6/2004 Bangalore et al.
7,194,471 B1 3/2007 Nagatsuka et al.
(Continued)

FOREIGN PATENT DOCUMENTS

CN 105786798 A 7/2016
CN 107122413 A 9/2017
CN 107943860 A 4/2018

OTHER PUBLICATIONS

International Search Report and Written Opinion to corresponding International Application No. PCT/US19/22195 dated May 23, 2019 (10 pages).

(Continued)

*Primary Examiner* — Jakieda R Jackson
(74) *Attorney, Agent, or Firm* — James J. DeCarlo; Greenberg Traurig, LLP

(57) ABSTRACT

The disclosed embodiments describe methods, systems, and apparatuses for determining user intent. A method is disclosed comprising obtaining a session text of a user; calculating, by the processor, a feature vector based on the session text; determining probabilities that the session text belongs to a plurality of intent labels, the probabilities calculated using a multi-level hierarchal intent classification model, the intent labels assigned to levels in the multi-level hierarchal intent classification model; and assigning a user intent to the session text based on the probabilities.

20 Claims, 7 Drawing Sheets

---

S410 — Obtain a session text of a user to determine a feature vector corresponding to the session text S420 — Input the feature vector into a hierarchical intent classification model, wherein the hierarchical intent classification model is trained based on a pre-built hierarchical intent system, wherein the hierarchical intent system comprises intent labels of a plurality of levels. In one embodiment, the hierarchical intent classification model comprises classifiers, each of the classifiers corresponding to each of the plurality of levels S430 — Determine the user intent based on the probabilities

(51) Int. Cl.
  *G06V 30/262* (2022.01)
  *G06F 18/24* (2023.01)
  *G06V 30/40* (2022.01)
  *G06V 30/148* (2022.01)
  *G06V 10/40* (2022.01)

(52) U.S. Cl.
  CPC .......... *G06V 30/153* (2022.01); *G06V 30/274* (2022.01); *G06V 30/40* (2022.01)

(56) References Cited

U.S. PATENT DOCUMENTS

| | | | |
|---|---|---|---|
| 7,496,500 | B2 | 3/2009 | Reed et al. |
| 7,499,923 | B2 | 3/2009 | Kawatani |
| 7,747,601 | B2 | 6/2010 | Cooper et al. |
| 3,156,430 | A1 | 4/2012 | Newman |
| 8,185,378 | B2 | 5/2012 | Burstein et al. |
| 8,265,939 | B2 | 9/2012 | Kanevsky et al. |
| 8,676,565 | B2 | 3/2014 | Larcheveque et al. |
| 8,775,341 | B1 | 7/2014 | Commons |
| 8,898,140 | B2 | 11/2014 | Cooper et al. |
| 9,262,528 | B2 | 2/2016 | Cooper et al. |
| 9,275,042 | B2 | 3/2016 | Larcheveque et al. |
| 9,892,113 | B2 | 2/2018 | Cross, III et al. |
| 10,430,447 | B2 | 10/2019 | Canim et al. |
| 10,446,147 | B1 | 10/2019 | Moniz et al. |
| 10,565,989 | B1 | 2/2020 | Wheeler et al. |
| 10,891,673 | B1 | 1/2021 | Sawaf |
| 11,081,104 | B1 | 8/2021 | Su et al. |
| 2007/0055564 | A1 | 3/2007 | Fourman |
| 2007/0055655 | A1 | 3/2007 | Bernstein et al. |
| 2008/0221903 | A1 | 9/2008 | Kanevsky et al. |
| 2009/0089044 | A1 | 4/2009 | Cooper et al. |
| 2009/0274384 | A1 | 11/2009 | Jakobovits et al. |
| 2010/0205180 | A1 | 8/2010 | Cooper et al. |
| 2010/0229120 | A1 | 9/2010 | Inoue et al. |
| 2011/0112824 | A1 | 5/2011 | Sayers et al. |
| 2011/0113385 | A1 | 5/2011 | Sayers et al. |
| 2011/0208730 | A1 | 8/2011 | Jiang et al. |
| 2012/0102037 | A1 | 4/2012 | Ozonat |
| 2012/0102046 | A1 | 4/2012 | Tamano |
| 2013/0236111 | A1* | 9/2013 | Pintsov ................ G06V 30/418 382/224 |
| 2014/0222503 | A1 | 8/2014 | Vijayaraghavan et al. |
| 2015/0012829 | A1 | 1/2015 | Brown et al. |
| 2015/0379013 | A1 | 12/2015 | Purcell et al. |
| 2016/0070731 | A1 | 3/2016 | Chang et al. |
| 2016/0247165 | A1 | 8/2016 | Ryabchun et al. |
| 2016/0299891 | A1* | 10/2016 | Koutrika ................ G06F 40/20 |
| 2017/0278514 | A1 | 9/2017 | Mathias et al. |
| 2017/0322923 | A1 | 11/2017 | Dixon et al. |
| 2018/0040020 | A1 | 2/2018 | Kurian et al. |
| 2018/0052929 | A1 | 2/2018 | Liu et al. |
| 2018/0101893 | A1 | 4/2018 | Dagan et al. |
| 2018/0181648 | A1 | 6/2018 | Chen |
| 2018/0203754 | A1 | 7/2018 | Beohar et al. |
| 2018/0239829 | A1 | 8/2018 | Dialani et al. |
| 2018/0261223 | A1 | 9/2018 | Jain et al. |
| 2018/0329879 | A1 | 11/2018 | Galitsky |
| 2018/0345989 | A1 | 12/2018 | Hashimoto |
| 2019/0034795 | A1 | 1/2019 | Zitouni et al. |
| 2019/0102397 | A1 | 4/2019 | Hornkvist et al. |
| 2019/0182382 | A1 | 6/2019 | Mazza et al. |
| 2019/0188590 | A1 | 6/2019 | Wu et al. |
| 2020/0019628 | A1 | 1/2020 | Chen et al. |

OTHER PUBLICATIONS

Office Action issued in corresponding Chinese Application No. 201810580483.5 dated Sep. 28, 2022 (8 pages).

* cited by examiner

METHOD AND APPARATUS FOR DETERMINING USER INTENT

CROSS-REFERENCE TO RELATED APPLICATIONS

This application is a continuation of and claims the benefit of U.S. application Ser. No. 16/352,159, filed on Mar. 13, 2019, which claims priority to Chinese Application No. 201810580483.5, filed on Jun. 7, 2018, both of which are hereby incorporated by reference in their entirety.

BACKGROUND

Technical Fields

Embodiments of the disclosure relate to the field of Internet technology, and in particular, to method and apparatuses for determining user intents.

Description of the Related Art

One important function of an intelligent customer service agent is "intent identification." An intelligent customer service agent needs to identify the intent included in a user session and then respond to the user session accordingly based on the identified intent. Therefore, the accuracy of "intent identification" directly affects the downstream components of the intelligent customer service agent and thus plays an important role in the entire processing of the agent.

However, at present, a flat-structured intent system is used to recognize user intents. Since the multiple intents in the flat-structured intent system are independent of one another without any association, the recognized user intent is often less accurate. Therefore, what is needed is a reasonable solution to determine the user intent in a fast and accurate manner.

SUMMARY

The disclosure describes methods, apparatuses, and computer-readable media for determining user intents, which can determine a user intent corresponding to a user session based on a pre-trained hierarchical intent classification model corresponding to a hierarchical intent system.

In one embodiment, method is disclosed comprising obtaining a session text of a user; calculating, by the processor, a feature vector based on the session text; determining probabilities that the session text belongs to a plurality of intent labels, the probabilities calculated using a multi-level hierarchal intent classification model, the intent labels assigned to levels in the multi-level hierarchal intent classification model; and assigning a user intent to the session text based on the probabilities.

In another embodiment, a non-transitory computer readable storage medium for tangibly storing computer program instructions capable of being executed by a computer processor is disclosed, the computer program instructions defining the steps of: obtaining a session text of a user; calculating, by the processor, a feature vector based on the session text; determining probabilities that the session text belongs to a plurality of intent labels, the probabilities calculated using a multi-level hierarchal intent classification model, the intent labels assigned to levels in the multi-level hierarchal intent classification model; and assigning a user intent to the session text based on the probabilities.

In another embodiment, an apparatus is disclosed comprising a processor and a storage medium for tangibly storing thereon program logic for execution by the processor, the stored program logic comprising logic performing the operations of obtaining a session text of a user; calculating, by the processor, a feature vector based on the session text; determining probabilities that the session text belongs to a plurality of intent labels, the probabilities calculated using a multi-level hierarchal intent classification model, the intent labels assigned to levels in the multi-level hierarchal intent classification model; and assigning a user intent to the session text based on the probabilities.

Thus, in the disclosed embodiments, based on the plurality of intent labels having a hierarchical relationship, the user intent corresponding to the user session may be determined more accurately.

BRIEF DESCRIPTION OF THE DRAWINGS

To more clearly illustrate the technical solutions in the multiple embodiments disclosed in the disclosure, the drawings which need to be used in the description of the embodiments will be introduced briefly in the following description. The drawings described below are merely some embodiments disclosed in the disclosure, and those of ordinary skill in the art may still derive other drawings from these drawings without significant effort.

DETAILED DESCRIPTION

The disclosed embodiments are described below with reference to the figures.

Figure 1:
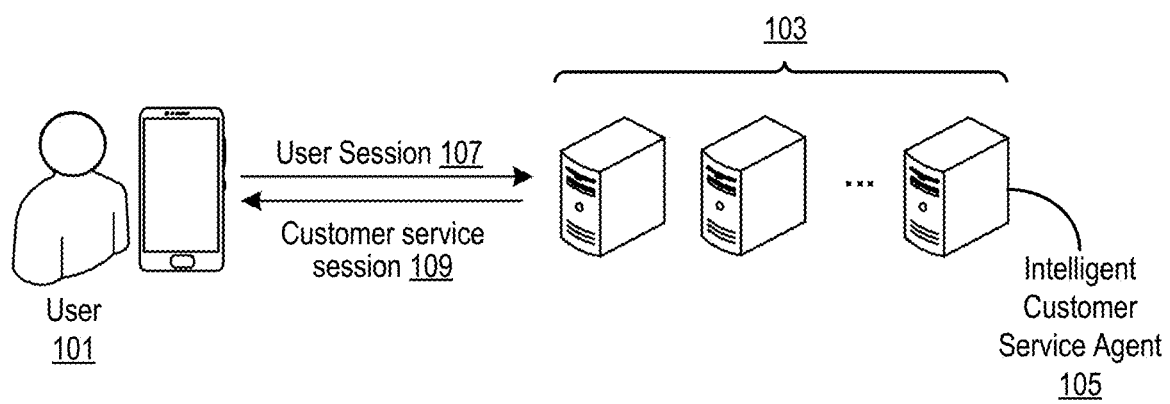
FIG. 1 is a diagram illustrating a use system for processing user intents according to some embodiments of the disclosure.

FIG. 1 is a diagram illustrating a use system for processing user intents according to some embodiments of the disclosure.

As shown in FIG. 1, a user (101) may use an electronic service (103) through various terminal devices (e.g., a telephone, a mobile phone, a tablet, etc.). The intelligent customer service agent (105) may determine the user intent based on the received user sessions, and then determine, according to the intent, a corresponding customer service session (e.g., 109) to respond to the user session (107). Determining the user intent based on the user session may be done by using the methods for determining user intents disclosed herein.

The disclosed embodiments are based on the following observations and statistics. At present, the user intent corresponding to user session is usually determined based on a flat-structured intent system. Since the multiple intents included in the flat-structured intent system are independent of one another without any association, the user intent determined based on such a system is often less accurate. In contrast, a hierarchical intent system includes hierarchical relationships among multiple intent labels, and a chain structure is presented among the intent labels of each level. For example, referring to the hierarchical intent system (200) shown in FIG. 2, the user intent shown with this this system is more accurate. Therefore, it is desirable to be able to train a corresponding classification model based on the hierarchical intent system. Based on this model, the user intent corresponding to the user session can then be determined. To train the classification model, it is generally necessary to train a corresponding plurality of classifiers according to the number of intent labels included in the system. For example, FIG. 2 includes 20 intent labels (201-220); and accordingly, 20 binary classifiers need to be trained. However, if this method is used, a large amount of training data will be needed. If the training data is insufficient, it becomes very difficult to implement this method and the obtained classification model would occupy a relatively large memory space due to the use of so many classifiers.

Based on the above observations and statistics, a simplified hierarchical intent classification model is employed in the disclosed embodiments. The number of classifiers included is the same as the number of levels (221, 222, 223) in the hierarchical intent system (200). For example, the hierarchical intent system in FIG. 2 includes three levels, and the corresponding hierarchical intent classification model includes three classifiers. In this way, the total amount of training data required to train the hierarchical intent classification model can be greatly reduced when compared with existing classifiers. The hierarchical intent classification model would only occupy a relatively small memory space.

The training process and the use process of the hierarchical intent classification model are similar. The main difference is that in the hierarchical intent classification model, the input data in the use process is the user session text with the intent to be determined; and the input data in the training process is the training text, wherein the training text may include historical user session text marked with an intent label; and the intent label marked may be determined based on a pre-built hierarchical intent system. Accordingly, the disclosed embodiments illustrate the use process of the hierarchical intent classification model without repeating the training process thereof. Hereinafter, a method for determining user intents disclosed in the disclosed embodiments will be described with reference to specific examples.

Figure 3:
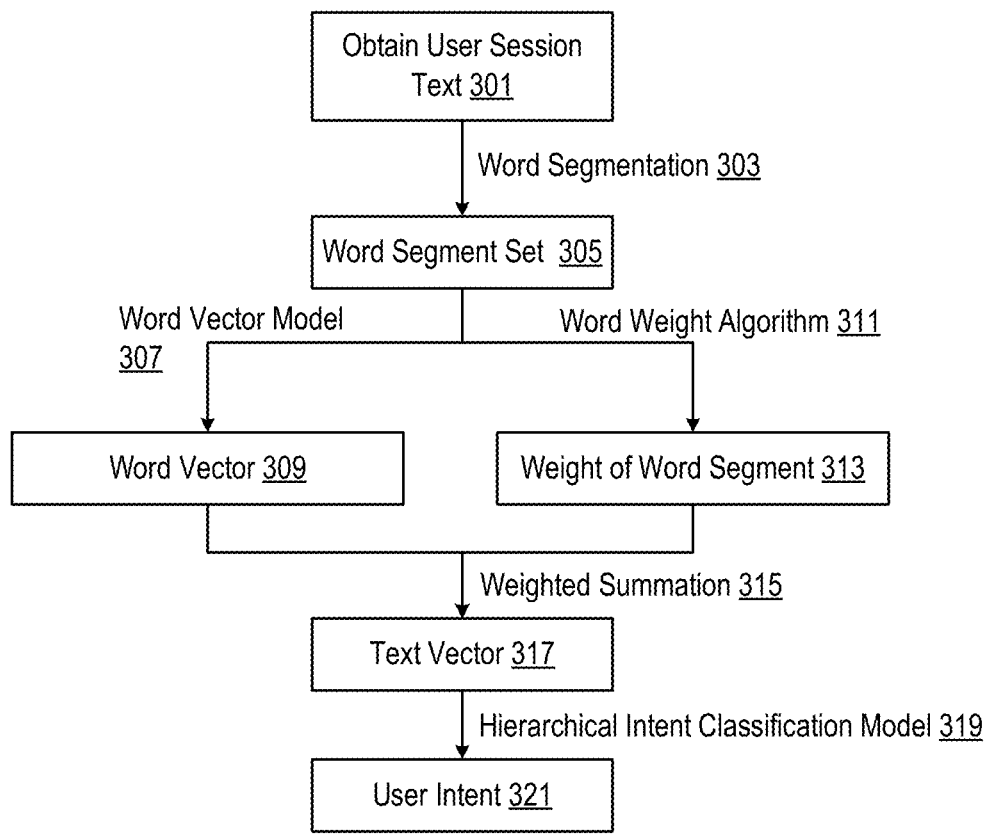
FIG. 3 is a flow diagram illustrating a determination process for user intents according to some embodiments of the disclosure.

FIG. 3 illustrates a flow diagram illustrating a determination process for user intents according to some embodiments of the disclosure.

According to one embodiment, first, a user session text is obtained (301) and a text vector corresponding to the session text is determined. In one example, determining the text vector corresponding to the session may comprise: performing word segmentation (303) of the user session text to obtain the corresponding word segmentation set (305). For example, word segmentation of the user session text "Could you teach me how to use coupons please?" may be performed using Stanford Word Segmenter, or similar segmentation/tokenization tool, to obtain the corresponding word segmentation set {"Could you", "teach me", "how to use", "coupons", "please"}. Next, based on the pre-trained word vector model (307), for example, the word2vec word vector model, the word vector of each word segment in the word segment set is determined (309). Based on a word weight algorithm (311), for example, the Term Frequency-Inverse Document Frequency (TF-IDF) algorithm, the weight value of each word segment is calculated (313). Then, based on the weight value of each word segment, a weighted summation is performed (315) on the word vectors of the corresponding word segments to obtain a text vector (317). The text vector is then inputted into a hierarchical intent classification model (319). The model may be trained, for example, based on the hierarchical intent system in FIG. 2. In this way, the user intent corresponding to the user session text, such as "how to use coupons" in FIG. 2, may be obtained (321). The following description provides further embodiments and details of the above-mentioned process.

Figure 4:
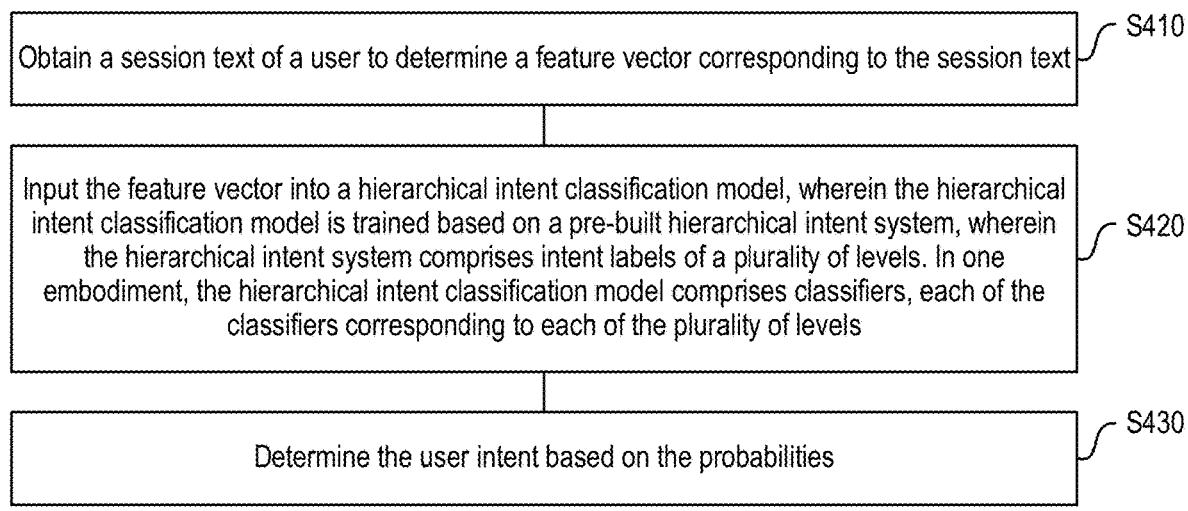
FIG. 4 is a flow diagram illustrating a method for determining user intents according to some embodiments of the disclosure.

FIG. 4 is a flow diagram illustrating a method for determining user intents according to some embodiments of the disclosure.

The illustrated method may be implemented on a device having processing capabilities such a server, a system, or an apparatus. One example of a device executing the method illustrated in FIG. 4 is the intelligent customer service agent in FIG. 1.

As shown in FIG. 4, the method includes the following steps.

Step S410: Obtain a session text of a user to determine a feature vector corresponding to the session text.

Step S420: Input the feature vector into a hierarchical intent classification model, wherein the hierarchical intent classification model is trained based on a pre-built hierarchical intent system, wherein the hierarchical intent system comprises intent labels of a plurality of levels. In one embodiment, the hierarchical intent classification model comprises classifiers, each of the classifiers corresponding to each of the plurality of levels. In one embodiment, step S420 further comprises determining, based on the feature vector by each of the classifiers, probabilities of the session text belonging to each intent label in each level.

Step S430: Determine the user intent based on the probabilities.

In S410, a session text of a user is obtained to determine a feature vector corresponding to the session text.

In one embodiment, the obtained user session text may include: the content of the session sent by the user when using the customer service, such as "The page always shows that the product is out of stock; when will it available?" or "What payment methods do you accept?"

In one embodiment, the determining a feature vector corresponding to the session text may comprise: first determining a text vector corresponding to the session text; and then determining a feature vector at least based on the text vector. In one embodiment, determining the text vector further comprises: first, determining a word segment set corresponding to the session text; next, determining a weight value of each word segment in the word segment set and determining a word vector for each of the word segments; and then, determining a text vector corresponding to the session text based on the word vector of each of the word segments and the corresponding weight values.

Further, in one embodiment, the determining the word segment set corresponding to the session text may comprise: performing word segmentation on the session text to obtain a corresponding word segment set. In one example, the various word segmentation algorithms may include: a dictionary-based word segmentation algorithm, such as a forward maximum matching method, an inverse maximum matching method, and a two-way matching word segmentation method; or a statistical-based machine learning algorithm, such as HMM (Hidden Markov model), CRF (Conditional Random Field), SVM (support vector machine), deep learning, and other algorithms. In one example, after the session text "What payment methods do you accept?" has been segmented, the word segmentation set obtained may be {"What", "payment methods", "do you", "accept"}. Therefore, a word segment set corresponding to the session text may be obtained.

In one embodiment, the determining a weight value of each word segment in the word segment set may comprise: determining a weight value of each word segment based on the word weight calculation algorithm. In one example, the word weight calculation algorithm may be a TF-IDF algorithm. As used herein, TF-IDF refers to a statistical method for evaluating the importance of a word in a file set or a file in a corpus. The importance of a word increases proportionally with the number of times it appears in the file, but the importance decreases with the frequency it has in the corpus. In another specific embodiment, the determining a weight value of each word segment in the word segment set may comprise: calculating information entropy of each of the word segments and using the information entropy as weight values for the corresponding word segments. Information entropy may indicate the probability of occurrence of a certain kind of information. Generally, a higher probability of occurrence of a kind of information indicates that it is more widely spread or more frequently used. Thus, information entropy may be used to represent the value of information, which in turn may be used to indicate the importance of a word in the corresponding text. In this way, the weight value $A_t$ of each word segment t in the word segment set may be determined by the TF-IDF algorithm or the information entropy calculation method in the prior art.

In one embodiment, the determining the word vector for each word segment may comprise: determining, based on the pre-trained word vector model, a word vector for each word segment in the word segment set. In some embodiments, the vector model can be obtained by performing training using a word representation algorithm. In some embodiments, the training on the word vector model may be carried out in an unsupervised manner. In one example, a large amount of training corpora used in the training may include data from multiple websites, e.g., data from the website Baidu Knows. In another example, a large amount of training corpora used in training may comprise a plurality of historical user sessions. In some embodiments, the word representation algorithm may be a word2vec algorithm and a GloVe (Global Vectors for Word Representation) algorithm; and the word vector model obtained accordingly is a word2vec algorithm-based word vector model and a GloVe algorithm-based word vector model. Herein, word2vec is an efficient tool to represent words as real-value vectors that Google, Inc. of Mountain View, Calif. open sourced in 2013. The processing of text content can be simplified through deep learning and training by turning the processing into vector operations in a k-dimensional vector space. A similarity in the vector space can be used to represent a semantic similarity of texts. GloVe is a tool that Stanford has open sourced for vectorizing words. GloVe enables vectors to include as much semantic and grammatical information as possible with the use of overall statistics features of a corpus and local context features (i.e., sliding windows). Thus, the word vector $w_t$ of each word segment t in the word segment set may be determined.

As described above, the weight value $A_t$ of each word segment t in the word segment set corresponding to the session text and the corresponding word vector $w_t$ may be determined. Thus, the text vector corresponding to the user session text may be determined. In one embodiment, the determining a text vector may comprise: performing a weighted summation on word vectors of each word segment in the word segment set according to the corresponding weight values of each word segment, and using the obtained sum vector as the corresponding text vector. In one example, the text vector may be determined with the following equation:

$$d=\Sigma_t w_t A_t \qquad \text{Equation 1}$$

In the equation (1), d represents the text vector, $w_t$ represents the word vector of each word segment t in the word segment set, and $A_t$ represents the weight value of the word segment t.

It should be noted that a custom coefficient may also be multiplied on the right side of the equal sign in the equation (1). For example, the custom coefficient may be 0.5, and the specific value may be set by the business operation personnel according to actual needs.

As can be seen from the above, the text vector is determined based on the weight of the word segment and the word vector of the word segment; and the word vector is determined based on a word vector model, such as a word2vec word vector model or a GloVe word vector model, that may identify the semantic feature. Therefore, the determined text vector may identify the importance of the words in the session text as well as the semantic features of the session text. Next, a feature vector corresponding to the session text is determined based at least on the text vector.

In one embodiment, the determining the feature vector may comprise: using the text vector as the feature vector; that is, the feature vector v is equal to the text vector d.

In another specific embodiment, the determining the feature vector may comprise: combining the weight values of each word segment into a weight vector, and combining the weight vector with the text vector; and using the vector obtained through combination as the feature vector. It should be noted that the weight vector a may be combined after the text vector d, like the feature vector v=(d, a); or the weight vector a may be combined before the text vector d, like the feature vector v=(a, d), which is not limited herein. In this way, the feature vector obtained by combining the weight vector and the text vector may enhance the identification of the weight of the word segment.

Based on the above, a feature vector corresponding to the session text may be determined.

In S420, input the feature vector into a pre-trained hierarchical intent classification model, wherein the hierarchical intent classification model is trained based on a pre-built hierarchical intent system, wherein the hierarchical intent system comprises intent labels of a plurality of levels; the hierarchical intent classification model comprises classifiers, each of the classifiers corresponding to each of the plurality of levels; and determine, based on the feature vector by each of the classifiers, probabilities of the session text belonging to each intent label in each level.

Figure 2:
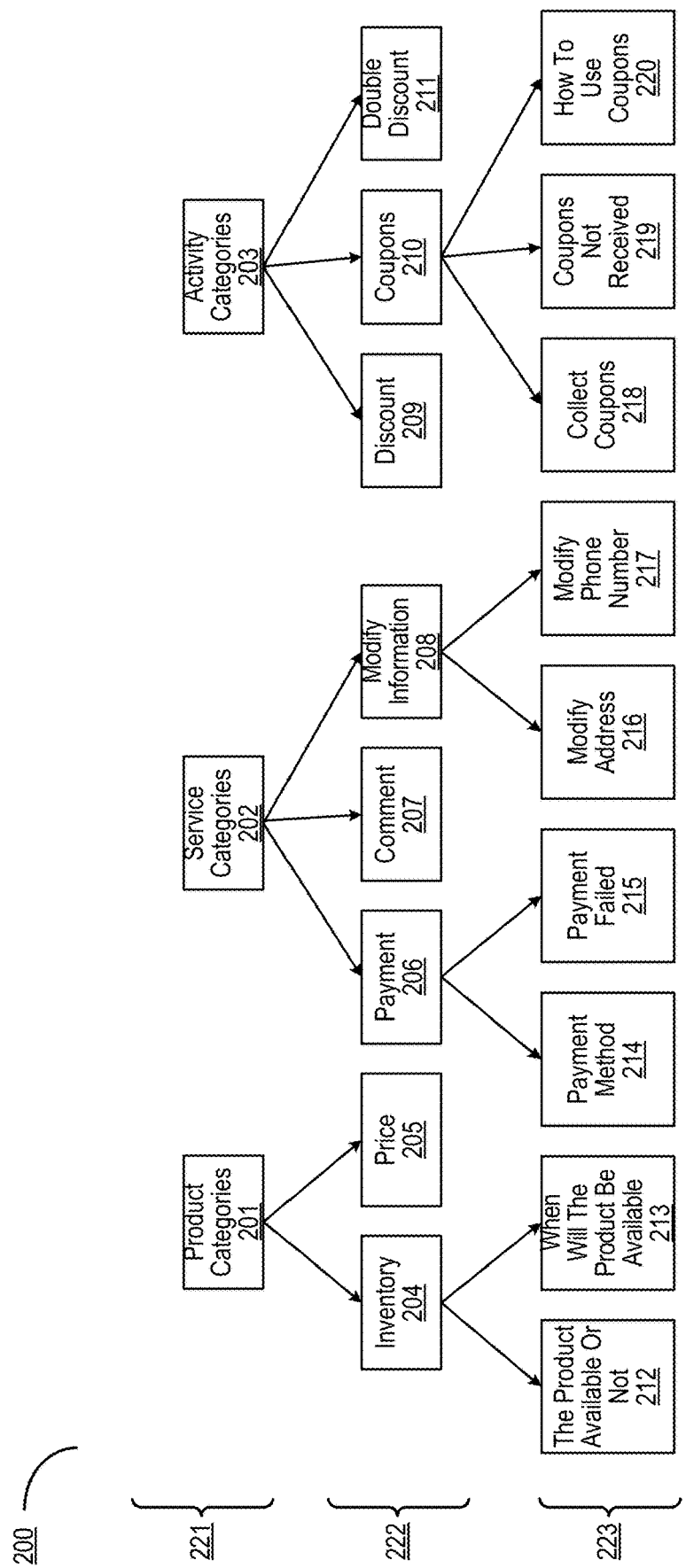
FIG. 2 is a diagram of a hierarchical intent system according to some embodiments of the disclosure.

According to one example, a pre-built hierarchical intent system as shown in FIG. 2 may include three levels of intent labels. Accordingly, the hierarchical intent classification model trained based on the system includes three classifiers that respectively correspond to the three levels. That is to say, classifiers corresponding to the first level, the second level, and the third level of the three levels are included.

According to one embodiment, the determining probabilities of the session text belonging to each intent label in each level may comprise: inputting the feature vector into a plurality of classifiers corresponding to the plurality of levels and obtaining probabilities of the session text belonging to each of the intent labels in each level.

According to another embodiment, the determining probabilities of the session text belonging to each intent label in each level may comprise: inputting the feature vector into a classifier corresponding to a first level of the plurality of levels, and obtaining probabilities of the session text belonging to each of the intent labels in the first level. In one example, the hierarchical intent system in FIG. 2 includes three levels, and the first level includes three intent labels. Accordingly, the feature vector may be inputted into the classifier corresponding to the first level. The obtained probabilities that the session text belongs to the intent labels "product categories," "service categories," and "activity categories" are 0.2, 0.7 and 0.1 respectively. Therefore, it is possible to determine the probabilities of the session text belonging to each of the intent labels in the first level.

Further, the determining probabilities of the session text belonging to each intent label in each level may further comprise: first, determining an i-th level combination vector based on the feature vector and probabilities of the session text belonging to each intent label in the i-th level of the plurality of levels; and then inputting the i-th level combination vector into a classifier corresponding to the (i+1)-th level, and obtaining probabilities of the session text belonging to each intent label in the (i+1)-th level. In one embodiment, determining the i-th level combination vector may comprise: using the probabilities of the session text belonging to each intent label of the i-th level as a vector element and combining the vector element with the feature vector to obtain an i-th level combination vector. For example, these vector elements may be combined after the last element in the feature vector, or they may be combined before the first element in the feature vector. In one example, a first level combination vector may be obtained. Further, in one example, the first level combination vector may be inputted into the classifier corresponding to the second level, and the probabilities of the session text belonging to each of the intent labels in the second level are obtained. For example, based on FIG. 2, the obtained probabilities that the session text belongs to the intent labels of the second level "inventory," "price," "payment," "comment," "modify information," "discount," "coupon," and "double discount" are 0.1, 0.1, 0.6, 0.0, 0.1, 0.0, 0.1 and 0.0 respectively.

Therefore, the probabilities outputted by the upper classifier and the feature vector may be used to determine the probabilities that correspond to each of the intent labels in the lower layer, thereby enabling the determination of the probabilities of the session text belonging to each intent label in each level in a top-down manner. In one example, based on the hierarchical intent system in FIG. 2, it can be assumed that the determined probabilities corresponding to each user intent are as those shown in the hierarchical intent system (500) of FIG. 5.

Figure 5:
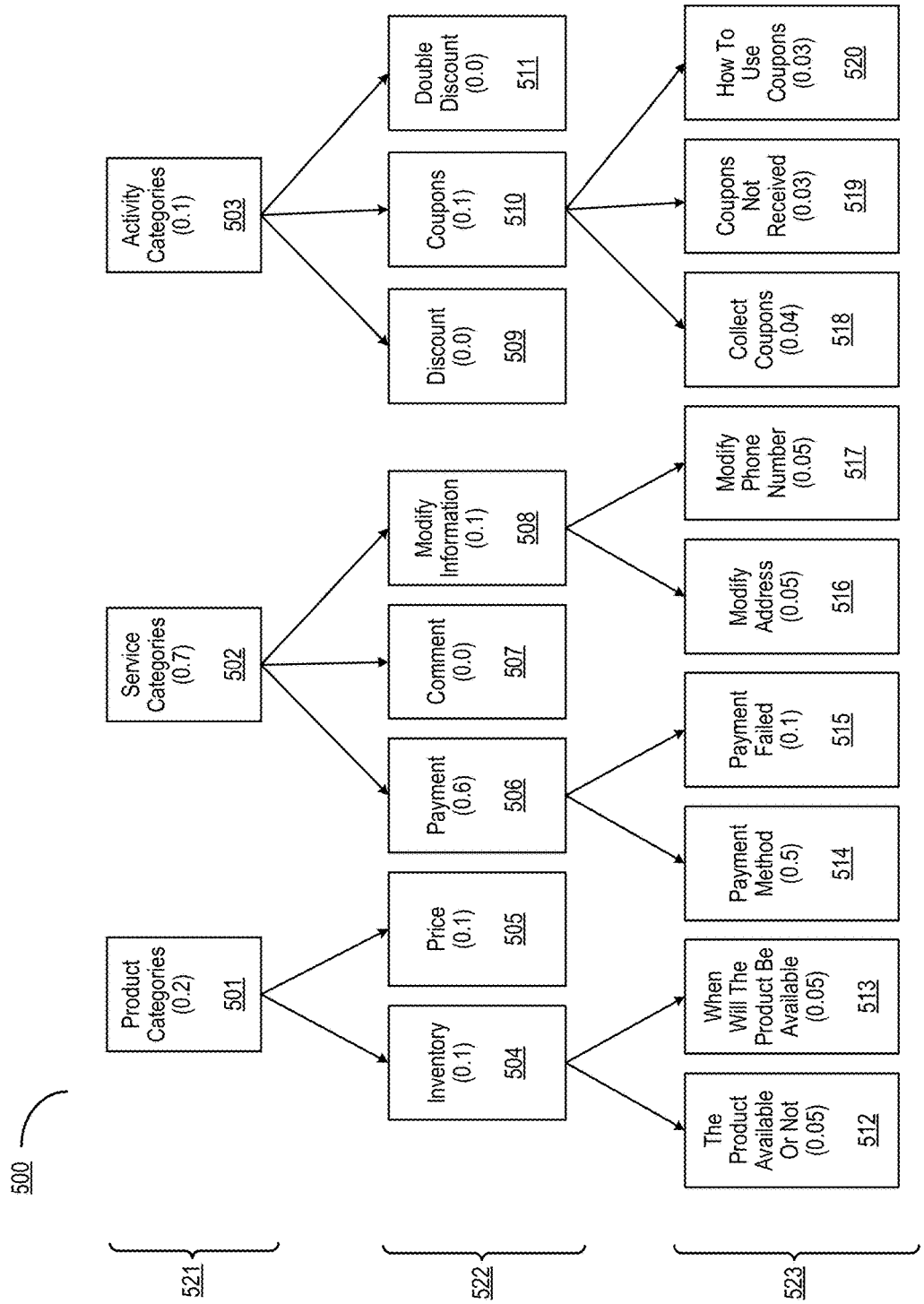
FIG. 5 is a probability diagram corresponding to a plurality of intent labels according to some embodiments of the disclosure.

It should be noted that, in general, the sum of all the probabilities outputted by each classifier is 1. That is, the sum of the probabilities corresponding to each intent label in each level in this disclosure is 1. For example, as shown in FIG. 5, the sum of the probabilities corresponding to the first level (521) (0.2, 0.7, and 0.1) is 1. In addition, in accordance with the hierarchical intent system, the probability corresponding to any of the parent nodes is equal to the sum of the probabilities corresponding to each of the child nodes. For example, as shown in FIG. 5, when the probability corresponding to the "service categories" (502) is 0.7, it can be assumed that the probabilities corresponding to "payment" (506), "comment" (507), and "modification information" (508) are 0.6, 0.0, and 0.1 respectively.

Based on the above, it is possible to determine the probabilities of the session text belonging to each of the intent labels (501-520) in each level (521-523).

In S430, the user intent corresponding to the session text is determined based on the probabilities determined in Step S420.

In one embodiment, the user intent is determined based on the probabilities and probability thresholds corresponding to each of the levels.

In one embodiment, the probability thresholds are determined based on the number of intent labels included in the corresponding level. In one example, the probability threshold $S_n$ corresponding to the n-th level may be determined based on the following equation:

$$S_n = \alpha_n / m_n \quad (2)$$

In the equation (2) $m_n$ is the number of intent labels included in the n-th level, and $\alpha_n$ is a custom coefficient corresponding to the n-th level. It should be noted that $a_n$ may be set based on experience. For example, $\alpha_n$ of each level may be all set to 1 or 2, or different value of $a_n$ may be set for any two classifiers. In a specific example, as shown in FIG. 2, the second level includes eight user intents, i.e., $m_2=8$. Assuming $\alpha_2=2$, then $S_2=0.25$ may be obtained accordingly. In another specific example, as shown in FIG. 2, the third level includes nine user intents, i.e., $m_3=9$. Assuming $\alpha_2=2$, then $S_3=0.22$ may be obtained accordingly.

Therefore, the probability thresholds corresponding to each level may be determined. Next, in one embodiment, a total number of levels corresponding to the plurality of levels is N, and wherein the determining the user intent may comprise: determining an N-th maximum probability among the plurality of probabilities corresponding to the N-th level; and using an intent label corresponding to the N-th maximum probability as the user intent that corresponds to the session text when the N-th maximum probability is greater than a probability threshold corresponding to the N-th level. In one example, as shown in FIG. 5, it can be determined that the third maximum probability among the nine probability thresholds corresponding to the third level is 0.5. Assuming that the third level probability threshold is 0.22, it can be determined that the maximum probability of the third level (0.5) is greater than the probability threshold (0.22), and the intent label "payment method" corresponding to 0.5 is used as the user intent corresponding to the session text.

Figure 6:
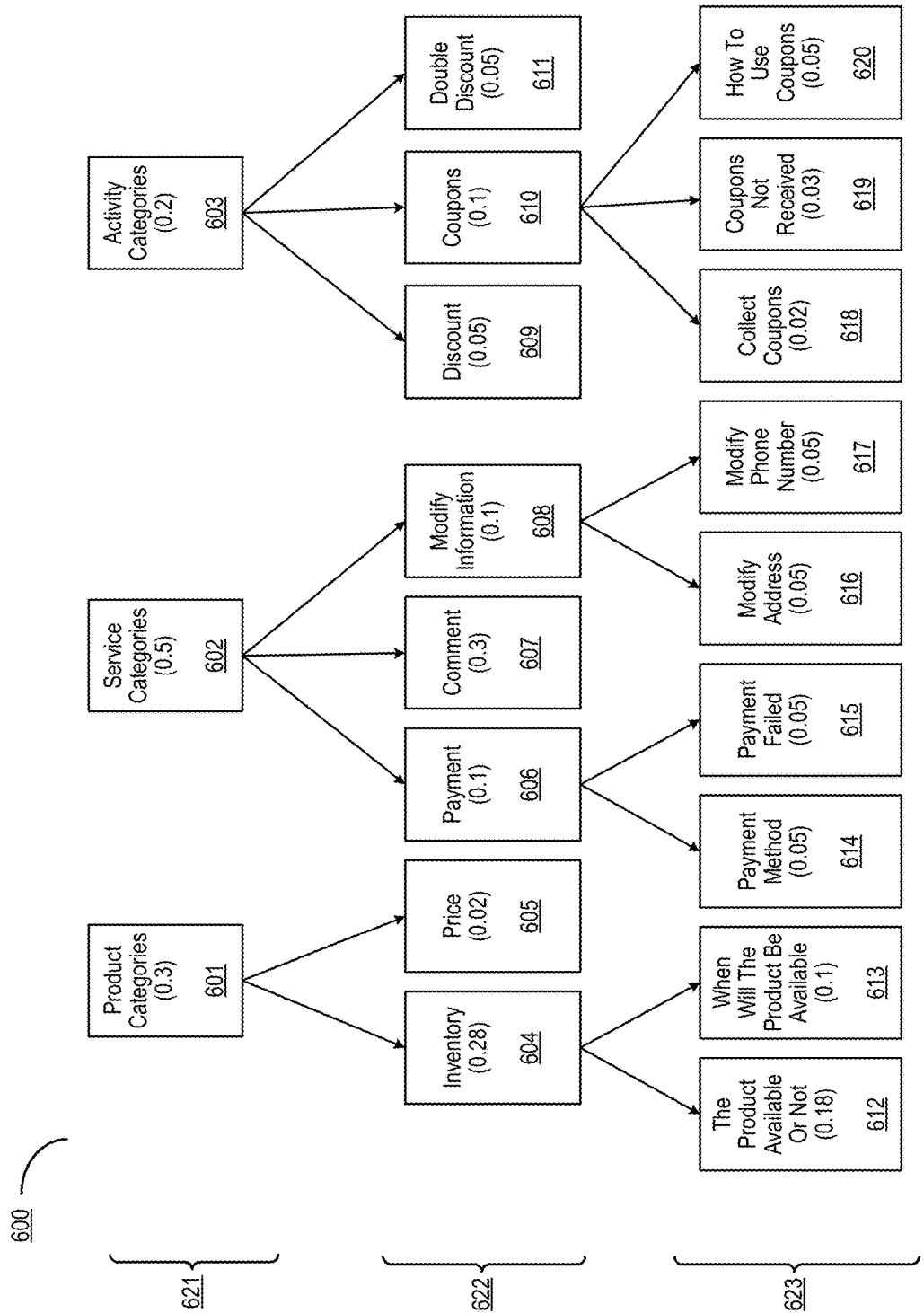
FIG. 6 is a probability diagram corresponding to a plurality of intent labels according to some embodiments of the disclosure.

Further, in one embodiment, the determining the user intents may further comprise: determining an (N−1)-th maximum probability among the plurality of probabilities corresponding to the (N−1)-th level when the N-th maximum probability is less than the probability threshold corresponding to the N-th level; and using an intent label corresponding to the N-th maximum probability as the user intent that corresponds to the session text when the N-th maximum probability is greater than a probability threshold corresponding to the N-th level. In one example, as shown in hierarchical intent system (600) FIG. 6, assuming that the probability threshold corresponding to the third level (623) is 0.22, it can be determined that the third level maximum probability (0.18) is smaller than the probability threshold (0.22) of the corresponding level. Therefore, return to the previous level (622), and determine that the second maximum probability among the eight probability thresholds corresponding to the second level is 0.3. Assuming that the second level probability threshold is 0.25, it can be determined that the maximum probability of the second level (0.3) is greater than the probability threshold of the corresponding level (0.25). Therefore, the intent label "comment" (607) corresponding to the second level (622) maximum probability in the hierarchical intent system (600) can be used as the user intent that corresponds to the session text.

It should be noted that if the maximum probability corresponding to the (N−1)-th level is still less than the corresponding probability threshold, then the process should continue by returning to (N−2)-th level, the (N−3)-th level . . . , until the probability of an intent label of a level is greater than the threshold preset for that level.

On the basis of determining the probabilities corresponding to each intent label (601-620) in each level (621-623), the leaf node of the hierarchical intent system is used as the starting point, i.e., the lowest intent label. The intent label of the maximum probability of each level is determined from bottom to top until the intent label with a probability value greater than the preset threshold is determined as the user intent. In this way, the final outputted user intent can then be ensured to be the finest-grained intent label corresponding to the session text.

It should be noted that in Step S410, the method may further comprise: the obtaining the session text of the user may comprise: obtaining the original session data of the user, and pre-processing the original session data to determine the session text.

In one embodiment, pre-processing the original session data may comprise: deleting the data that belongs to the predetermined categories; for example, special symbols (e.g. ♪, ⌘), emoji, and uniform resource locators (URLs) included therein are deleted. Data in these categories are deleted because of the limited user intent they may include; in other words, the above group generally does not include useful information related to a user intent.

In addition, both the previously mentioned pre-trained word vector model and hierarchical intent classification model can be trained based on historical user session text sets. The training of word vector model may certainly be unsupervised, while the training of hierarchical intent model is supervised with the need to label the historical user sessions with the corresponding user intents, so as to obtain the corresponding training texts. The obtaining the historical user session text set may comprise: obtaining an original historical user session data set, and pre-processing each piece of historical user session data therein to determine the historical user session text set. Further, in one embodiment, pre-processing each piece of historical user session data may include: deleting the data in the predetermined category therein, wherein the predetermined category may include, in addition to special symbols, emoji and URLs mentioned above, long sentences, i.e., historical user session with a length more than a predetermined number of characters (for example, 20 characters). For example, a historical user session of "Although it is raining heavily today, it's time for me to receive the product I've purchased" may be deleted. It should be noted that the main reason to delete long sentences is that long sentences usually include fewer words that reflect a user intent. If long sentences in the historical session text set are kept, subsequent calculations on long sentences will consume a lot of resources. Therefore, when determining the historical user session text set for training the model, long sentences may be directly deleted.

As can be seen from the foregoing, in the method for determining user intents disclosed in the embodiments of the present disclosure, first, obtaining a session text of a user to determine a feature vector corresponding to the session text; next, inputting the feature vector into a hierarchical intent classification model, wherein the hierarchical intent classification model is trained based on a pre-built hierarchical intent system, wherein the hierarchical intent system comprises intent labels of a plurality of levels, and the hierarchical intent classification model comprises classifiers, each of the classifiers corresponding to each of the plurality of levels; and determining by each of the classifiers, based on the feature vector corresponding to the session text, probabilities of the session text belonging to each intent label in each level; and then, determining the user intent based on the probabilities. Thus, based on the plurality of intent labels having a hierarchical relationship, the user intent corresponding to the user session may be determined more accurately.

According to one embodiment of another aspect, an apparatus for determining user intent is further provided.

Figure 7:
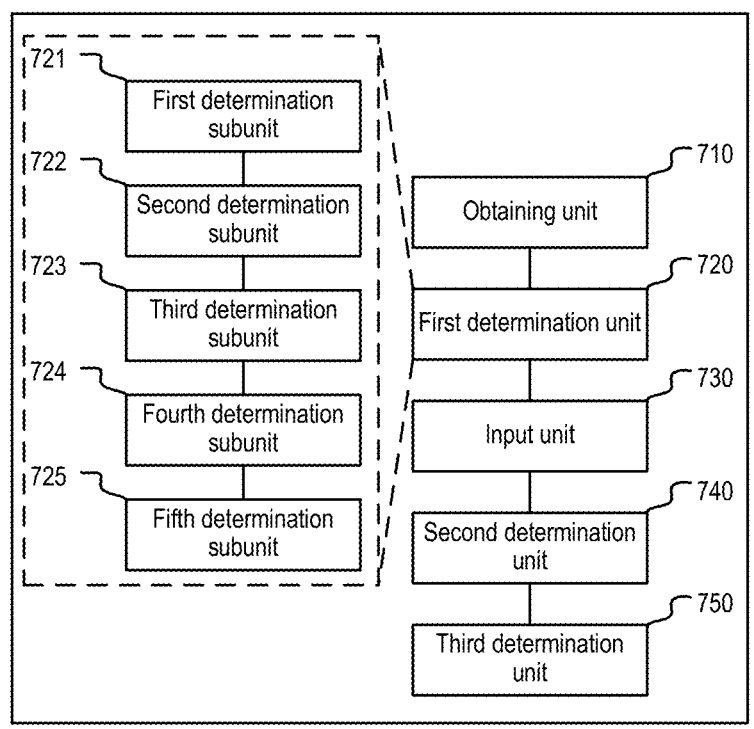
FIG. 7 is a block diagram of an apparatus for determining user intents according to some embodiments of the disclosure.

FIG. 7 is a block diagram of an apparatus for determining user intents according to some embodiments of the disclosure.

As shown in FIG. 7, the apparatus (700) comprises: an obtaining unit (710), configured to obtain a session text of the user; a first determination unit (720), configured to determine a feature vector corresponding to the session text; an input unit (730), configured to input the feature vector into a hierarchical intent classification model, wherein the hierarchical intent classification model is trained based on a pre-built hierarchical intent system, wherein the hierarchical intent system comprises intent labels of a plurality of levels; the hierarchical intent classification model comprises classifiers, each of the classifiers corresponding to each of the plurality of levels; a second determination unit (740), configured for each of the classifiers to determine, at least based on the feature vector, probabilities of the session text belonging to each intent label in each level; and a third determination unit (750), configured to determine the user intent based on the probabilities.

According to one embodiment, the first determination unit (720) specifically comprises: a first determination subunit (721), configured to determine a word segment set corresponding to the session text; a second determination subunit (722), configured to determine a weight value for each word segment in the word segment set; a third determination subunit (723), configured to determine a word vector for each word segment; a fourth determination subunit (724), configured to determine a text vector corresponding to the session text based on the word vector of each of the word segments and the corresponding weight values; and a fifth determination subunit (725), configured to determine the feature vector based at least on the text vector.

Further, in one embodiment, the fourth determination subunit (724) is specifically configured to: perform a weighted summation on word vectors of each word segment in the word segment set according to the corresponding weight values of each word segment, and using the obtained sum vector as the text vector.

In one embodiment, the fifth determination subunit (725) is specifically configured to: use the text vector as the feature vector.

In another embodiment, the fifth determination subunit (725) is specifically configured to: combine the weight values of each word segment into a weight vector, and combine the weight vector with the text vector; and use the vector obtained through combination as the feature vector.

In one embodiment, the second determination subunit (722) is specifically configured to: determine the weight value based on a word weight calculation algorithm, wherein the word weight calculation algorithm comprises a TF-IDF algorithm; or calculate information entropy of each of the word segments and use the information entropy as weight values for each of the word segments.

According to one embodiment, the hierarchical intent classification model is further trained based on a classification algorithm and a pre-acquired training text set, wherein training texts in the training text set comprise historical user session texts marked with intent labels, and the marked intent labels are determined based on the hierarchical intent system.

According to one embodiment, the third determination unit (750) is specifically configured to: input the feature vector into a classifier corresponding to a first level of the plurality of levels, and obtain probabilities of the session text belonging to each of the intent labels in the first level.

According to one embodiment, the third determination unit (750) is further configured to: determine an i-th level combination vector based on the feature vector and probabilities of the session text belonging to each intent label in the i-th level of the plurality of levels; and input the i-th level combination vector into a classifier corresponding to the (i+1)-th level, and obtain probabilities of the session text belonging to each intent label in the (i+1)-th level.

According to one embodiment, the third determination unit (750) is further configured to: determine the user intent based on the probabilities and probability thresholds corresponding to each of the levels.

Further, in one embodiment, the probability thresholds are determined based on a number of intent labels comprised in a corresponding level.

In one embodiment, the total number of levels corresponding to the plurality of levels is N, and the third determination unit (750) is specifically configured to: determine an N-th maximum probability among the plurality of probabilities corresponding to the N-th level; and use an intent label corresponding to the N-th maximum probability as the user intent when the N-th maximum probability is greater than a probability threshold corresponding to the N-th level.

Still further, in one embodiment, the third determination unit (750) is further configured to: determine an (N−1)-th maximum probability among the plurality of probabilities corresponding to the (N−1)-th level when the N-th maximum probability is less than the probability threshold corresponding to the N-th level; and use an intent label corresponding to the N-th maximum probability as the user intent when the N-th maximum probability is greater than a probability threshold corresponding to the N-th level.

As can be seen from the foregoing, in the apparatus for determining user intents disclosed in the embodiments of the present disclosure, an obtaining unit (710) is configured to obtain a session text of the user; a first determination unit (720) is configured to determine a feature vector corresponding to the session text; an input unit (730) is configured to input the feature vector into a hierarchical intent classification model, wherein the hierarchical intent classification model is trained based on a pre-built hierarchical intent system, wherein the hierarchical intent system comprises intent labels of a plurality of levels; the hierarchical intent classification model comprises classifiers, each of the classifiers corresponding to each of the plurality of levels; a second determination unit (740) is configured for each of the classifiers to determine, at least based on the feature vector that corresponds to the session text, probabilities of the session text belonging to each intent label in each level; and a third determination unit (750) is configured to determine the user intent based on the probabilities. Thus, based on the plurality of intent labels having a hierarchical relationship, the user intent corresponding to the user session may be determined more accurately.

As above, according to another aspect, a computer-readable storage medium is further provided; the computer-readable storage medium having stored thereon a computer program for enabling a computer to perform the method described in conjunction with FIG. 4 when the computer program is executed in the computer.

According to still another aspect, a computing device comprising a memory and a processor is further provided, wherein the memory having executable codes stored therein, and the processor implementing the method described in conjunction with FIG. 4 when executing the executable codes.

Those skilled in the art will appreciate that in one or more examples described above, the functions described in various embodiments disclosed herein can be implemented through hardware, software, firmware, or any combination thereof. When implemented with software, the functions may be stored in a computer-readable medium or transmitted as one or more instructions or codes on a computer-readable medium.

The specific implementations described above further explain the objectives, technical solutions, and advantageous effects of the various embodiments disclosed herein. It should be understood that the above description is only the specific implementations of the various embodiments disclosed herein, and is not intended to limit the protection scope of the various embodiments disclosed herein. Any modifications, equivalents, improvements and the like made based on the technical solutions of the various embodiments disclosed herein should be under the protection scope of the various embodiments disclosed in the present disclosure.

We claim:

1. A method comprising:
   obtaining, by a processor, a session text of a user;
   calculating, by the processor, a feature vector based on the session text by:
      identifying a word segment set corresponding to the session text, the word segment set comprising a plurality of word segments,
      calculating a weight value for each of the plurality of word segments,
      determining a word vector for each of the plurality of word segments,
      determining a text vector corresponding to the session text based on the word vector of each of the plurality of word segments and corresponding weight values, and
      using the feature vector as the text vector;
   determining, by the processor, probabilities, based on the feature vector, that the session text belongs to a plurality of intent labels, the probabilities calculated using a hierarchal intent classification model comprising multiple classifiers associated with multiple tiers of a hierarchal intent system, the plurality of intent labels associated with levels in the hierarchal intent system, wherein the multiple classifiers are trained using user session text data labeled with the plurality of intent labels; and
   determining, by the processor, a user intent to the session text based on the probabilities.

2. The method of claim 1, the determining the text vector comprising:

performing, by the processor, a weighted summation on word vectors of each of the plurality of word segments according to corresponding weight values of each word segment, the weighted summation generating a sum vector; and using, by the processor, the sum vector as the corresponding text vector.

3. The method of claim 1, the using the feature vector as the text vector comprising:

combining, by the processor, weight values of each of the plurality of word segments into a weight vector;

combining, by the processor, the weight vector and the text vector into a combined vector; and using, by the processor, the combined vector as the feature vector.

4. The method of claim 1, the determining probabilities that the session text belongs to the plurality of intent labels comprising:

inputting, by the processor, the feature vector into a plurality of classifiers corresponding to the levels of the hierarchal intent classification model; and obtaining, by the processor, probabilities of the session text belonging to each of the plurality of intent labels in each of the levels.

5. The method of claim 1, the determining probabilities that the session text belongs to the plurality of intent labels comprising:

inputting, by the processor, the feature vector into a first classifier corresponding to a first level of the levels;

obtaining, by the processor, probabilities of the session text belonging to each of the plurality of intent labels in the first level based on output of the first classifier;

determining, by the processor, a combination vector based on the feature vector and the probabilities of the session text belonging to each of the plurality of intent labels in the first level; and inputting, by the processor, the combination vector into a second classifier corresponding to a second level of the hierarchal intent classification model, and obtaining probabilities of the session text belonging to each intent label in the second level.

6. The method of claim 1, the determining the user intent to the session text based on the probabilities comprising determining, by the processor, the user intent based on the probabilities and probability thresholds corresponding to each of the levels of the hierarchal intent classification model.

7. The method of claim 1, wherein the session text comprises a text statement generated by a user in a chat session.

8. A non-transitory computer readable storage medium for tangibly storing computer program instructions capable of being executed by a computer processor, the computer program instructions defining steps of:

obtaining a session text of a user;

calculating a feature vector based on the session text by:

identifying a word segment set corresponding to the session text, the word segment set comprising a plurality of word segments, calculating a weight value for each of the plurality of word segments, determining a word vector for each of the plurality of word segments, determining a text vector corresponding to the session text based on the word vector of each of the plurality of word segments and corresponding weight values, and using the feature vector as the text vector;

determining probabilities, based on the feature vector, that the session text belongs to a plurality of intent labels, the probabilities calculated using a hierarchal intent classification model comprising multiple classifiers associated with multiple tiers of a hierarchal intent system, the plurality of intent labels associated with levels in the hierarchal intent system, wherein the multiple classifiers are trained using user session text data labeled with the plurality of intent labels; and determining a user intent to the session text based on the probabilities.

9. The non-transitory computer readable storage medium of claim 8, the determining the text vector comprising:

performing a weighted summation on word vectors of each of the plurality of word segments according to corresponding weight values of each word segment, the weighted summation generating a sum vector; and using the sum vector as the corresponding text vector.

10. The non-transitory computer readable storage medium of claim 8, the using the feature vector as the text vector comprising:

combining the weight values of each of the plurality of word segments into a weight vector;

combining the weight vector and the text vector into a combined vector; and using the combined vector as the feature vector.

11. The non-transitory computer readable storage medium of claim 8, the determining probabilities that the session text belongs to the plurality of intent labels comprising:

inputting the feature vector into a plurality of classifiers corresponding to the levels of the hierarchal intent classification model; and obtaining probabilities of the session text belonging to each of the plurality of intent labels in each of the levels.

12. The non-transitory computer readable storage medium of claim 8, the determining probabilities that the session text belongs to the plurality of intent labels comprising:

inputting the feature vector into a first classifier corresponding to a first level of the levels;

obtaining probabilities of the session text belonging to each of the plurality of intent labels in the first level based on output of the first classifier;

determining a combination vector based on the feature vector and the probabilities of the session text belonging to each of the plurality of intent labels in the first level; and inputting the combination vector into a second classifier corresponding to a second level of the hierarchal intent classification model, and obtaining probabilities of the session text belonging to each intent label in the second level.

13. The non-transitory computer readable storage medium of claim 8, the determining the user intent to the session text based on the probabilities comprising determining the user intent based on the probabilities and probability thresholds corresponding to each of the levels of the hierarchal intent classification model.

14. The non-transitory computer readable storage medium of claim 8, wherein the session text comprises a text statement generated by a user in a chat session.

15. An apparatus comprising:

a processor; and a storage medium for tangibly storing thereon program logic for execution by the processor, the stored program logic comprising:

logic, executed by the processor, for obtaining a session text of a user, logic, executed by the processor, for calculating a feature vector based on the session text by: identifying a word segment set corresponding to the session text, the word segment set comprising a plurality of word segments, calculating a weight value for each of the plurality of word segments, determining a word vector for each of the plurality of word segments, determining a text vector corresponding to the session text based on the word vector of each of the plurality of word segments and corresponding weight values, and using the feature vector as the text vector, logic, executed by the processor, for determining probabilities, based on the feature vector, that the session text belongs to a plurality of intent labels, the probabilities calculated using a hierarchal intent classification model comprising multiple classifiers associated with multiple tiers of a hierarchal intent system, the plurality of intent labels associated with levels in the hierarchal intent system, wherein the multiple classifiers are trained using user session text data labeled with the plurality of intent labels, and logic, executed by the processor, for determining a user intent to the session text based on the probabilities.

16. The apparatus of claim 15, the logic for determining the text vector comprising:

logic, executed by the processor, for performing a weighted summation on word vectors of each of the plurality of word segments according to corresponding weight values of each word segment, the weighted summation generating a sum vector; and logic, executed by the processor, for using the sum vector as the corresponding text vector.

17. The apparatus of claim 15, the logic for using the feature vector as the text vector comprising:

logic, executed by the processor, for combining the weight values of each of the plurality of word segments into a weight vector;

logic, executed by the processor, for combining the weight vector and the text vector into a combined vector; and logic, executed by the processor, for using the combined vector as the feature vector.

18. The apparatus of claim 15, the logic for determining probabilities that the session text belongs to the plurality of intent labels comprising:

logic, executed by the processor, for inputting the feature vector into a plurality of classifiers corresponding to the levels of the hierarchal intent classification model; and logic, executed by the processor, for obtaining probabilities of the session text belonging to each of the plurality of intent labels in each of the levels.

19. The apparatus of claim 15, the logic for determining probabilities that the session text belongs to the plurality of intent labels comprising:

logic, executed by the processor, for inputting the feature vector into a first classifier corresponding to a first level of the levels;

logic, executed by the processor, for obtaining probabilities of the session text belonging to each of the plurality of intent labels in the first level based on output of the first classifier;

logic, executed by the processor, for determining a combination vector based on the feature vector and the probabilities of the session text belonging to each of the plurality of intent labels in the first level; and logic, executed by the processor, for inputting the combination vector into a second classifier corresponding to a second level of the hierarchal intent classification model, and obtaining probabilities of the session text belonging to each intent label in the second level.

20. The apparatus of claim 15, wherein the session text comprises a text statement generated by a user in a chat session.

* * * * *